United States Patent [19]

Nachbur et al.

[11] 4,230,361
[45] Oct. 28, 1980

[54] VEHICLE BODY CONSTRUCTION

[75] Inventors: Roland Nachbur, Turgi; Dieter Faisst, Zurich, both of Switzerland

[73] Assignee: Swiss Aluminium Ltd., Chippis, Switzerland

[21] Appl. No.: 955,772

[22] Filed: Oct. 30, 1978

[30] Foreign Application Priority Data

Nov. 3, 1977 [CH]  Switzerland ...................... 13414/77

[51] Int. Cl.³ ........................................... B62D 27/00
[52] U.S. Cl. .................................. 296/193; 105/406 R
[58] Field of Search .............. 296/193, 187, 203, 178; 105/411, 406 R

[56] References Cited

U.S. PATENT DOCUMENTS

| | | | |
|---|---|---|---|
| 3,557,714 | 1/1971 | Aquino | 105/406R |
| 4,059,303 | 11/1977 | Mauri | 296/187 |

*Primary Examiner*—John J. Love
*Assistant Examiner*—John A. Carroll
*Attorney, Agent, or Firm*—Bachman and LaPointe

[57] ABSTRACT

The present invention relates to an improved vehicle body construction which comprises a plurality of horizontal and vertical extending extruded sections joined together by means of connecting portions wherein said extruded metal sections and said connecting portions are provided with guiding elements which lie in a plane substantially perpendicular to the wheel axle of the vehicle body.

19 Claims, 22 Drawing Figures

FIG. 1
FIG. 2
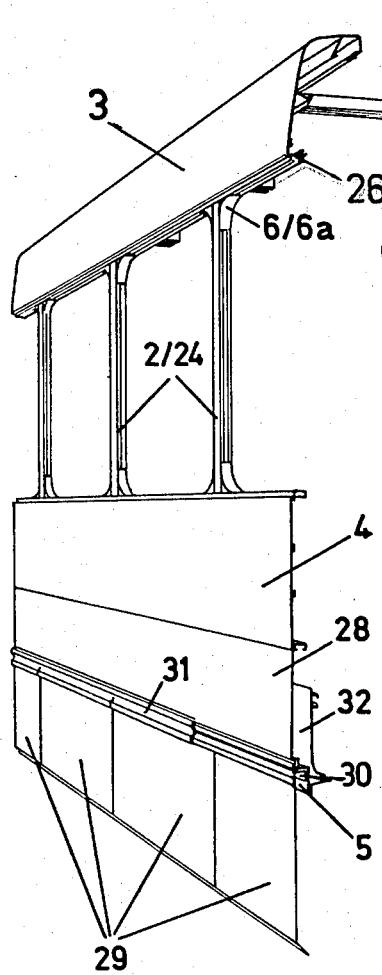
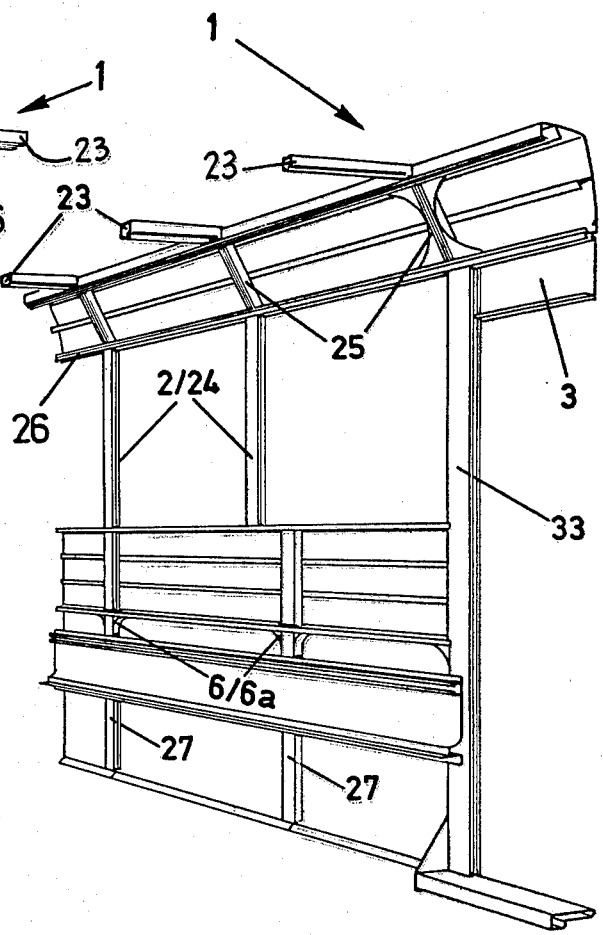

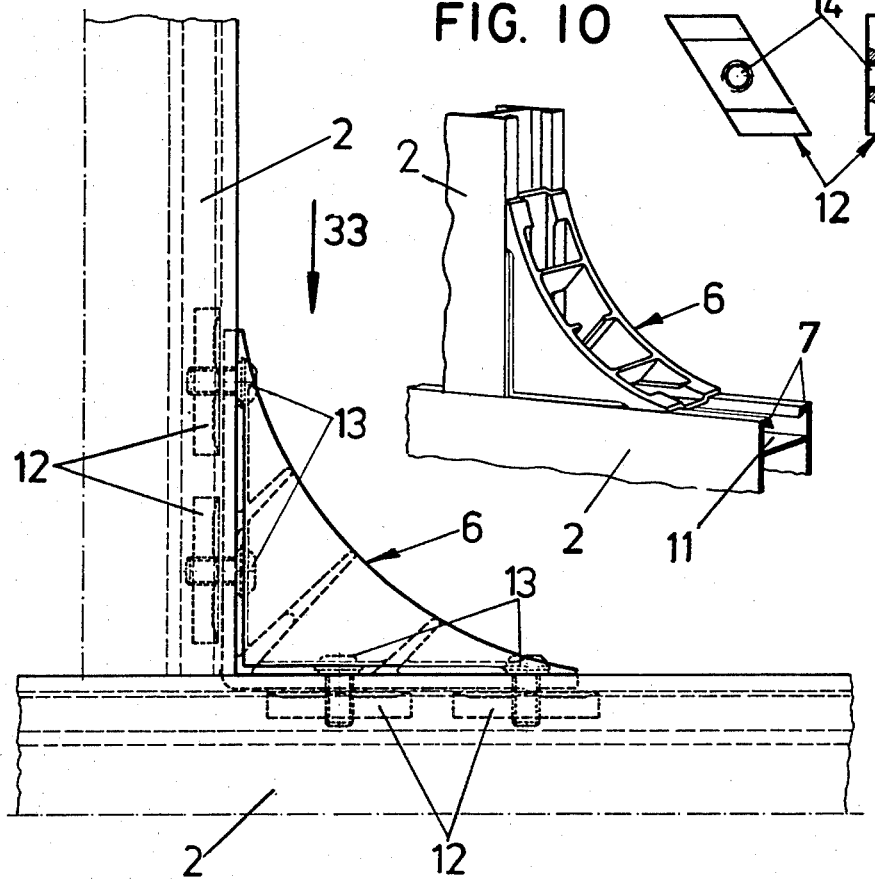
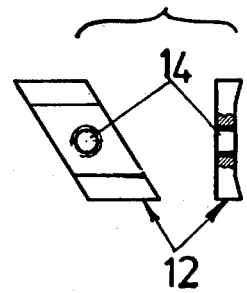
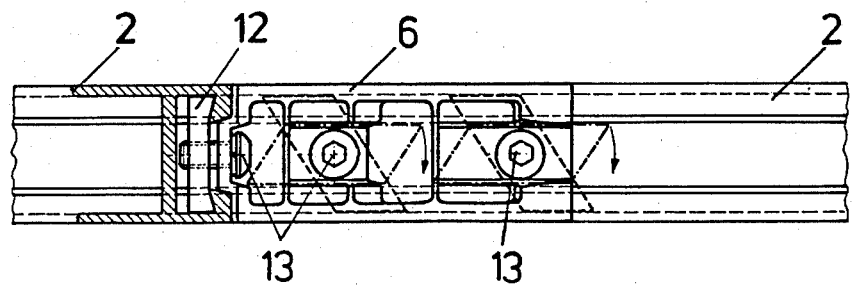

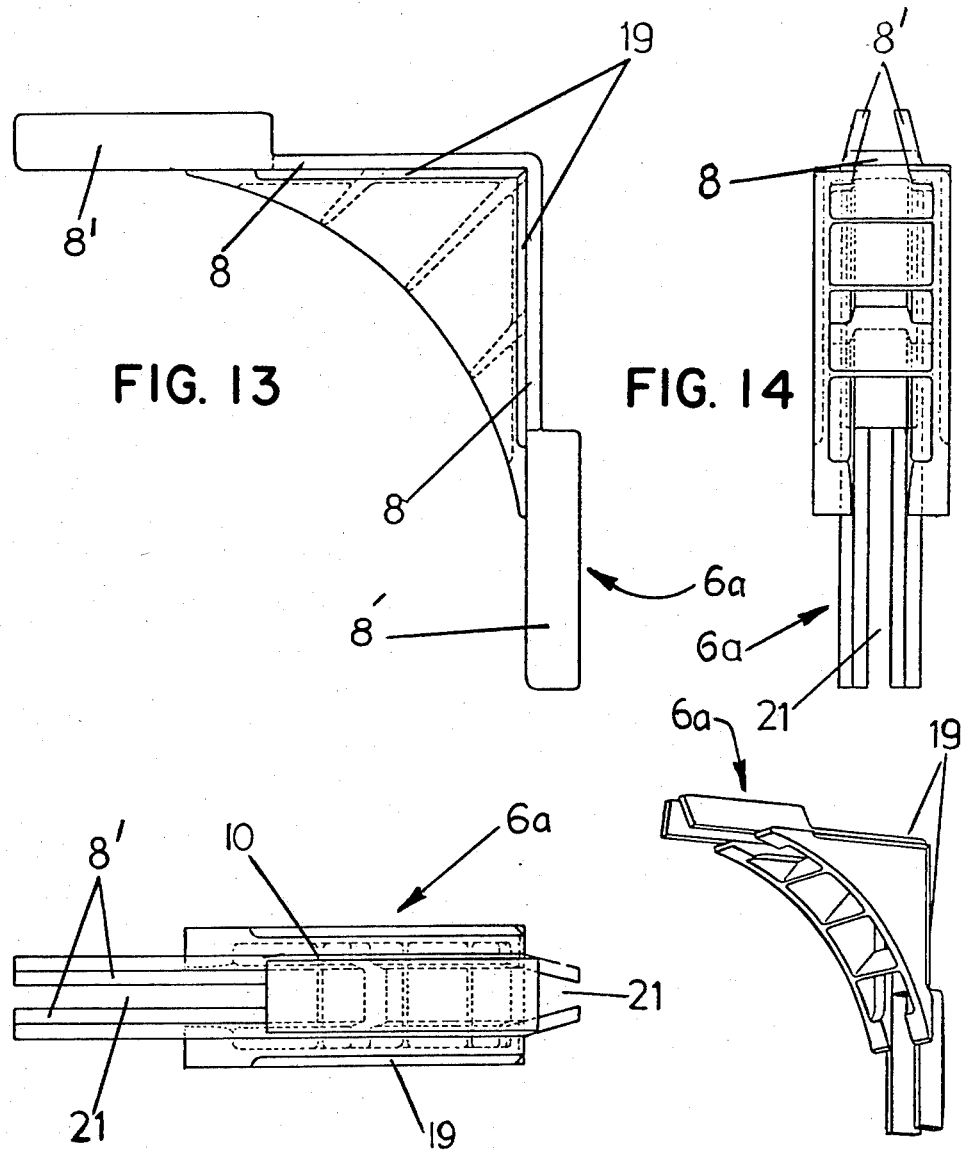

FIG. 17
FIG. 18
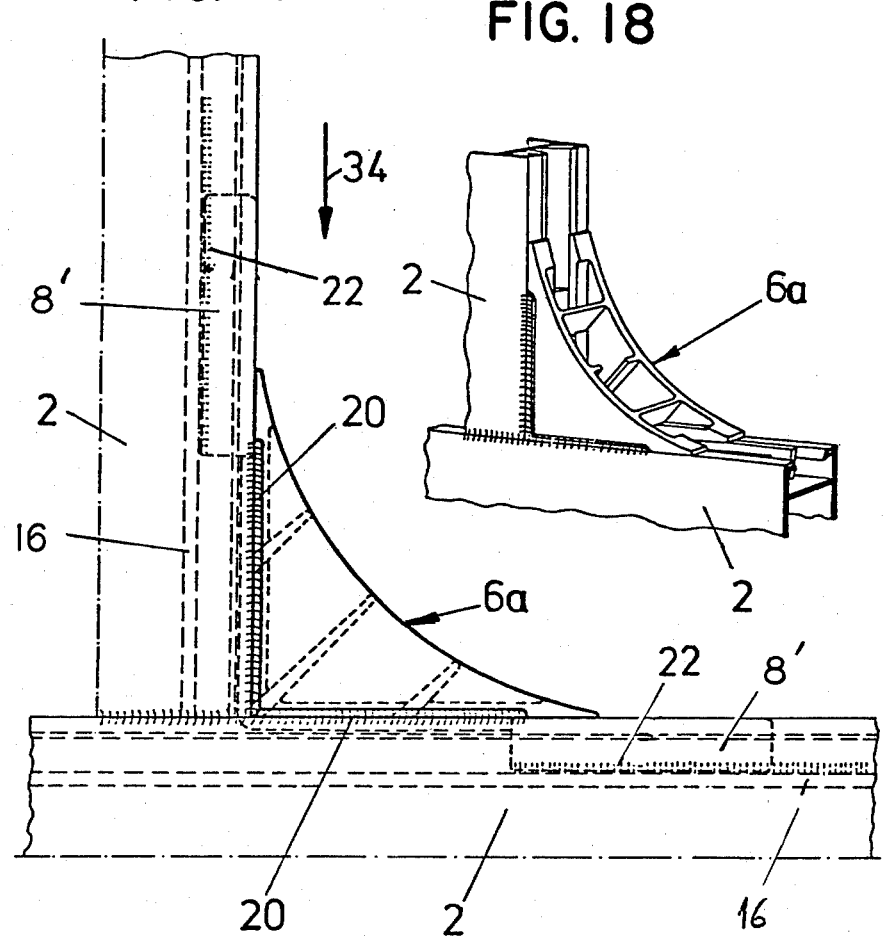
FIG. 19
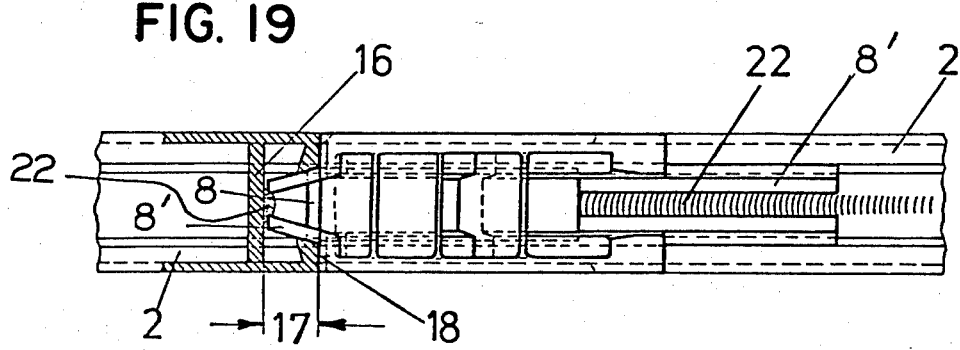

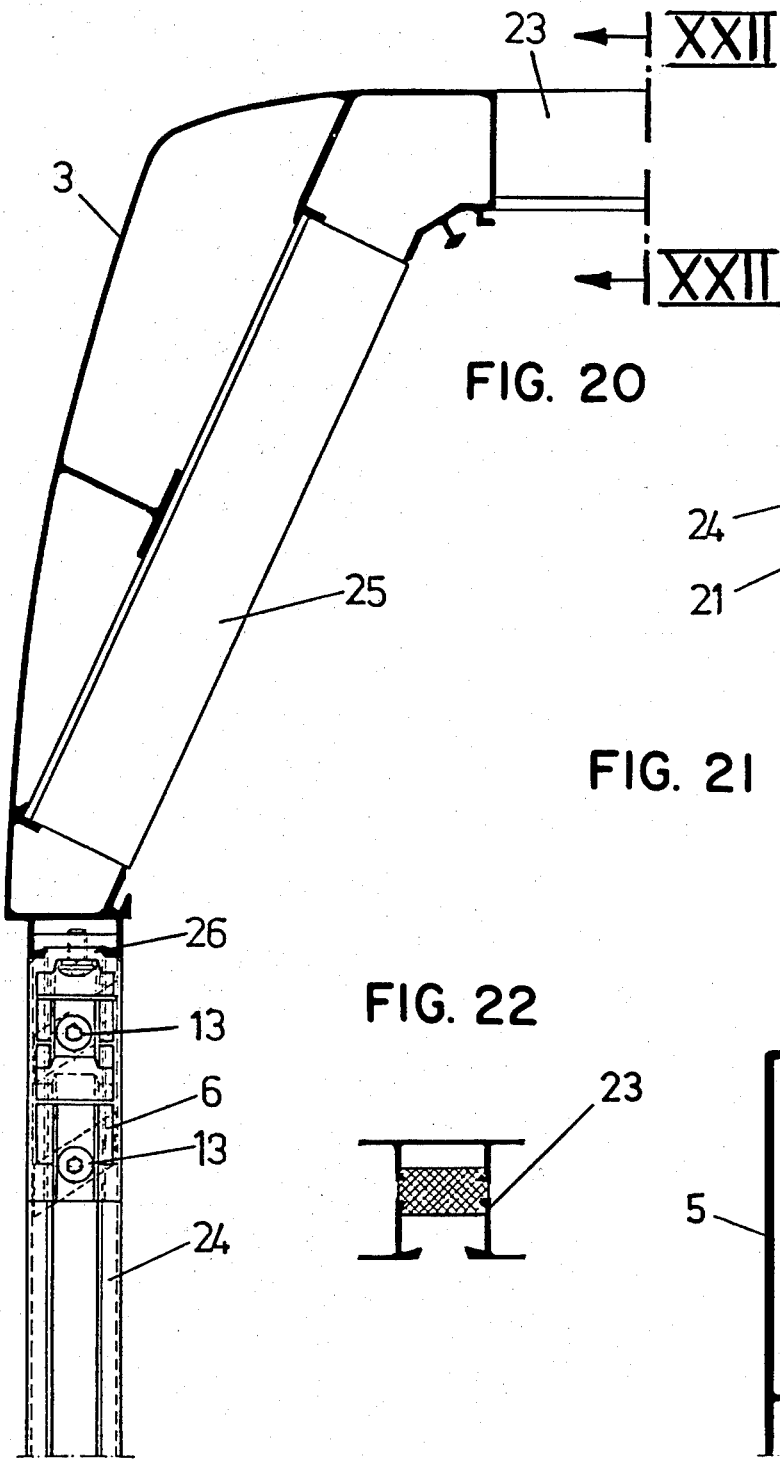
FIG. 20
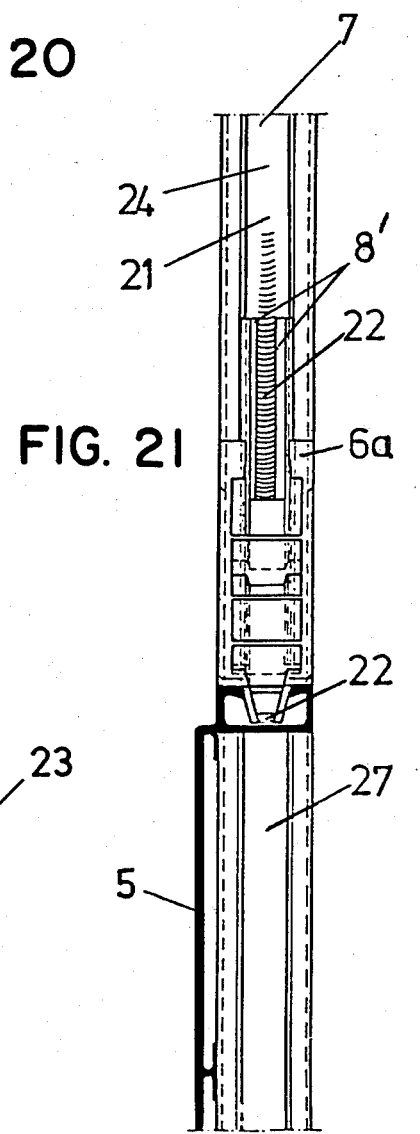
FIG. 21
FIG. 22
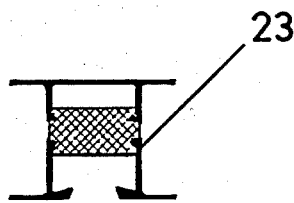

VEHICLE BODY CONSTRUCTION

BACKGROUND OF THE INVENTION

The present invention relates to a vehicle body construction for road or rail vehicles for carrying passengers, especially vehicles of light construction, which consists of a plurality of metal sections, preferably extruded sections, connected together by means of corner connecting pieces.

Known vehicle constructions comprising the assembly of a plurality of metal sections suffer from a number of disadvantages. The relatively long manufacture and repair times for assembling and disassembling the individual component parts substantially increases the cost of manufacture and repair of vehicle bodies.

Furthermore it has been found, especially in light metal construction, that the connecting pieces for the individual component parts of the vehicle bodies do not, in many cases, meet the requirements for running operation, nor do they attain the average life of the vehicle.

SUMMARY OF THE INVENTION

The principle object of the present invention is to provide a vehicle body construction for road or rail vehicles for carrying passengers, especially vehicles of light metal construction, which overcome the disadvantages of known vehicle constructions as described hereinabove.

In accordance with the present invention, the foregoing object is achieved by providing the sectional bars, the upper and/or central longitudinals and the corner connecting pieces of the vehicle body, with guiding elements in engagement with one another, whereby these components are guided in a plane, preferably lying at right angles to the wheel axle of the vehicle. The guiding elements are in the form of a groove or rib and the components are secured together by bolting, welding or the like.

BRIEF DESCRIPTION OF THE DRAWINGS

The drawings show an example of a preferred embodiment of the present invention wherein, FIG. 1 is a perspective side view of a vehicle body viewed from the outside with corner connecting pieces at the windows;

FIG. 2 is a perspective side view of a vehicle body viewed from the inside, without corner connecting pieces at the windows;

FIG. 9 is a side view of a corner connecting piece connected to two sectional bars by bolting;

FIG. 10 is a perspective view of the corner connecting piece of FIG. 9 connected to the two sectional bars by bolting;

FIG. 11 is a side and top view of a clamping piece with a threaded bore suited for use in the bolted connection shown in FIGS. 9 and 10;

FIG. 12 is a top view of the bolted connection shown in FIG. 9 in the direction of the arrow No. 33 in FIG. 9;

FIG. 13 is a side view of a connecting piece used with a welded connection with a sectional bar;

FIG. 14 is a front view of the corner connecting piece shown in FIG. 13;

FIG. 15 is a top view of the corner connecting piece shown in FIGS. 13 and 14;

FIG. 16 is a perspective view of the corner connecting piece shown in FIGS. 13, 14 and 15;

FIG. 17 is a side view of a corner connecting piece connected by welding two sectional bars;

FIG. 18 is a perspective view of the corner connecting piece shown in FIG. 17 connected by welding with two sectional bars;

FIG. 19 is a top view of the welded connection shown in FIGS. 17 and 18, in the direction of the arrow No. 34 in FIG. 17;

FIG. 20 is a sectional view through a bolted connection between a roof longitudinal section, a sectional bar, and a corner connecting piece;

FIG. 21 is a sectional view through a welded connection between a central longitudinal section, a sectional bar, and a corner connecting piece; and FIG. 22 is a sectional view through a roof arch section taken along line XXII—XXII in FIG. 20.

DETAILED DESCRIPTION

Figure 3:
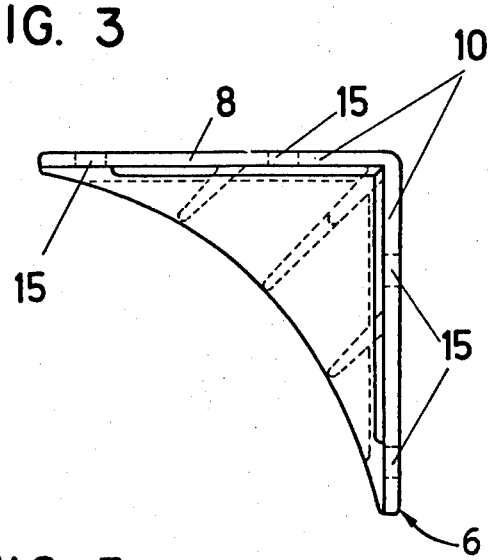
FIG. 3 is a side view of a corner connecting piece provided for a bolted connection.
Figure 4:
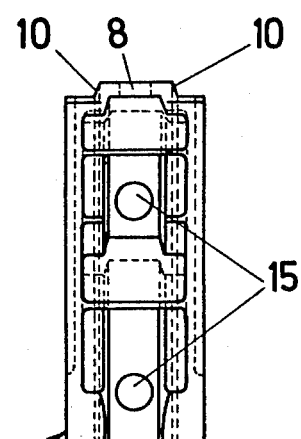
FIG. 4 is a front view of the corner connecting piece shown in FIG. 3.
Figure 5:
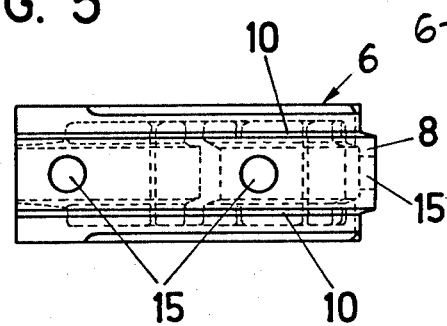
FIG. 5 is a top view of the corner connecting piece shown in FIGS. 3 and 4.
Figure 6:
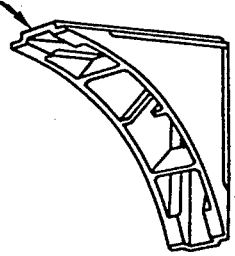
FIG. 6 is a perspective view of the corner connecting piece shown in FIGS. 3, 4 and 5.
Figure 7:
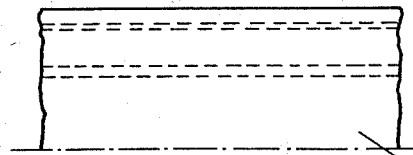
FIG. 7 is a side view of a sectional bar provided with a groove.
Figure 8:
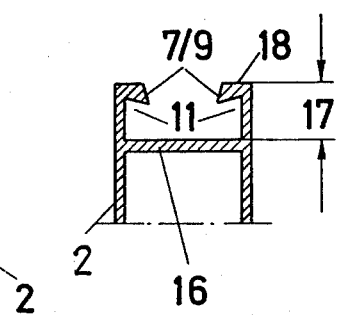
FIG. 8 is a cross sectional view of the sectional bar shown in FIG. 7.

In the vehicle body construction 1 according to FIGS. 1–22 there are connected together, by bolting and/or welding, sectional bars 2, roof longitudinals 3, central longitudinals 4 serving as wall cladding, intermediate pieces 5, as well as corner connecting pieces 6, 6a arranged for reinforcement at particularly loaded points.

As can be seen with reference to FIGS. 3–10 and 12–21, the components 2, 6 and 6a are provided with grooves 7 and/or ribs 8, respectively, by which these components are guided in the longitudinal direction of the vehicle body 1. The grooves 7 and ribs 8 are provided on the sides thereof with obliquely inclined surfaces 9 and 10 respectively, which abut together. Furthermore, as can be seen in FIGS. 7, 8, 9, 10, 12 and 22, the grooves 7 have undercuts 11 on each side thereof, adapted to receive a component of clamping piece 12, for providing a bolted connection as shown in FIG. 9, between components 2 and 6 as can be seen particularly from FIG. 12. Each of the clamping pieces 12 are provided with a threaded bore 14 for reception of a bolt 13 which secures the components together.

For producing the clamping bolted connection between a corner connecting piece 6 and a sectional bar 2, a bolt 13 is inserted, for example through a bore 15 in the corner connecting piece 6 provided with a rib 8, and thereupon a clamping piece 12 is threaded onto each bolt 13, introduced in its longitudinal direction into the groove 7 in sectional bar 2, and swung into the undercuts 11 of the groove 7 by rotation of the bolt 13 in a clockwise direction. By further tightening of the bolt 13, the corner connecting piece 6 is firmly clamped to the sectional bar 2 while the obliquely inclined surfaces 9 and 10 of the groove 7 and of the rib 8, respectively, engage firmly together. In connection with the assembly of the vehicle, it should particularly be noted that all the parts of the vehicle body 1 provided with ribs 8 have bores 15 for the production of a clamping bolt connection through which a bolt 13 can be inserted.

The corner connecting piece 6a shown in FIGS. 13 to 16, is used for a welded connection with another vehicle component and is provided with a pair of tongues 8' which extend from each rib 8 beyond the ends of the corner connecting pieces 6a. The tongues guide the corner connecting piece 6a in the grooves 7 in an improved manner. The height of the tongues 8' is greater than the height of the ribs 8 so that when they are inserted in the grooves 7 of the sectional bar 2 (see FIGS. 17 and 19), the tongues 8' lie with an edge in close proximity to the surface of the web 16 running in the longitudinal direction of the sectional bar 2.

With reference to FIGS. 17, 18, 19 and 21, the assembly of welded connections between the components 6a having ribs 8 and the components 2 having grooves 7 and webs 16 is accomplished by inserting ribs 8 in the grooves 7 as best seen in FIG. 19. The ribs 8 extend over the length of the groove 7 and lie at a predetermined spacing 17 (FIG. 19) from a surface 18 on the part having the grooves 7, the spacing 17 corresponds approximately to the height of the tongues 8'.

In order to weld the components 6a having ribs 8 in an advantageous manner to the components 2 having grooves 7, bevels 19, see FIGS. 13, 15, 16, are provided on the components 6a. These bevels enable a weld run 20 to be applied to the side surface of these bevels 19 on the component 6 on one hand and to the groove 7 on component 2 on the other hand. The tongues 8' extending beyond the two ends of the corner connecting pieces 6a are provided with a gap 21 between them extending in the longitudinal direction, for facilitating the formation of a welded connection. As can be seen in FIG. 19 a weld run 22 is arranged, by which the tongues 8' of the corner connecting piece 6a are connected with the web 16 of the component 2 having the groove 7.

The roof according to FIGS. 1, 2 and 20 is characterized essentially by a high longitudinally extending roof longitudinal 3 in the form of a hollow section, which at the same time serves as outer skin. In the neighborhood of the roof arches 23 and the window pillars 24, the open section of the roof longitudinal 3 is stiffened by struts 25, in order to ensure a satisfactory load distribution. The roof longitudinals 3, arranged on each side of the vehicle body, are connected in any known manner to the roof arches 23. In the side wall region, the roof longitudinal 3 has a connecting portion 26 for connecting the roof 3 to the window pillars 24. The hollow section advantageously offers the possibility of installing cables and insulation in the roof as well as providing an air passage.

By thermal insulating the roof longitudinals 3 of the roof, as well as by employment of insulating roof arches 23 and struts 25, the formation of condensed water is totally avoided. The roof can be prefabricated as a whole complete with internal finish.

The window portion is so formed that the insertion of glazing can take place, whether by means of adhesive or by means of clamping rubber sections. The window pillars 24 consist of rectangular sections with lateral connecting parts. With glazing secured with adhesive, which for example permits the production of a totally smooth external contour, the window column covering and the retention of the internal skin takes place through a unitary clamping section known per se, not shown, which is applied to the connecting parts of the roof longitudinal 3, of the window pillars 24, and of the side wall section 4. With glazing clamped in a further known manner by means of rubber section, the column covering and the retention of the inner skin takes place by this same glazing retaining section.

The side wall is constituted essentially of a high, longitudinally extending, central longitudinal or side wall cladding section 4 open to the interior, which at the same time serves as external skin and collision protection for passengers. In the neighborhood of securing columns or window pillars 24, the side wall section 4 is stiffened by struts 28, in order to ensure a satisfactory distribution of load. The vertical position of the side wall section 4 is advantageously so chosen that it does not require to be cut away over the wheel arches. Furthermore, by the side wall section 4 preferably extending over the entire length of the vehicle, the possibility was further provided of arranging the window sub-division independently of the distribution of cross beams on the chassis. The connection of the chassis to the side wall section 4 takes place by means of mounting columns 27, which are connected to the side wall section 4 in the previously described manner according to the invention, with the help of the corner connecting piece 6 or 6a.

The lower side wall portion consists externally on the one hand of an easily assembled and dismounted longitudinally extending cladding section 28, and on the other hand of simple covers 29, which can be used over the entire length of the bus.

The cladding section 28 is connected in the usual way at its upper part with the connecting part of the side wall section 4, or as the case may be snapped into the latter or inserted, and was riveted or bolted at the lower part to the mounting columns 27 and an intermediate section 5. The lower part of the cladding section 28 is at the same time so shaped that it can receive one part of a rubber hinge 31.

The covers 29 consist of simply folded aluminum sandwich sheets, the upper edges of which are gripped in a reinforcing section 30, which at the same time receives a part of the rubber hinge 31.

On the inside of the mounting columns 27 as well as the intermediate section 5, there is fastened a floor longitudinal section 32 with the help of fastening members known per se, which receives the floor and at the same time provides a fastening possibility for the seats, which are not shown further.

By the employment of for example cladding sections 28 of three different heights, as well as by a variable assembly of the intermediate section 5 and of the floor longitudinal 32, the height of the side wall can be made of continuously different height.

The side walls are terminated at the front and rear portion, and also in the door region, by vertically extending column section 33 which, in conjunction with the roof arches 23 and the struts 25 serves as a roll-over hoop.

The vehicle body construction according to the invention, in comparison with the known vehicle body constructions of the previously identified kind, has several advantages, which relate essentially first to the improvement of all the junction connections in the vehicle body as well as on the other hand to the simple construction of the vehicle body, preferably made of extruded sections, while in addition it should be mentioned that the vehicle body construction is particularly suited for light construction, in which sections of aluminum alloys, preferably extruded, are employed.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A vehicle body construction for use in a vehicle having at least one wheel axle comprising a plurality of horizontal and vertical extending metal sections connected together, the improvement comprising:
    a first horizontal metal section having a first guide means;
    a second horizontal metal section having a second guide means, said second horizontal metal section being disposed substantially parallel to said first horizontal metal section;
    a first vertical metal section having a third guide means and a forth guide means, said first vertical metal section being disposed substantially perpendicular to and extending between said first and said second horizontal metal sections;
    connecting means for securing said first vertical metal section to said first and said second horizontal metal sections;
    said connecting means including fifth guide means for matingly engaging said first guide means with said third guide means and said second guide means with said fourth guide means.

2. A vehicle body construction according to claim 1 wherein all of said guide means lie in a plane substantially perpendicular to said wheel axle.

3. A vehicle body construction according to claim 1 wherein said first, said second, said third and said fourth guide means comprises a substantially U-shaped member having a base portion and two substantially upwardly extending leg portions.

4. A vehicle body construction according to claim 3 wherein each of said upwardly extending leg portions is provided on the free end thereof with an inwardly extending projection having a downwardly converging side wall portion.

5. A vehicle body construction according to claim 1 wherein said connecting means includes a substantially L-shaped connecting portion.

6. A vehicle body construction according to claim 1 wherein said fifth guide means for matingly engaging said first guide means with said third guide means and said second guide means with said fourth guide means comprises a rib having a pair of converging side wall portions.

7. A vehicle body construction according to claim 4 wherein said fifth guide means for matingly engaging said first guide means with said third guide means and said second guide means with said fourth guide means comprises a rib having a pair of converging side wall portions for matingly engaging with said side wall portion on each of said projections.

8. A vehicle body construction according to claim 7 wherein said connecting means includes a substantially L-shaped connecting portion.

9. A vehicle body construction according to claim 1 wherein said connecting means is secured to said guide means in mating engagement by bolting.

10. A vehicle body construction according to claim 1 wherein said connecting means is secured to said guide means in mating engagement by welding.

11. A vehicle body construction according to claim 4 wherein said fifth guide means for matingly engaging said first guide means with said third guide means and said second guide means with said fourth guide means comprises clamping block means received within said U-shaped members between said base portion and said inwardly extending projections.

12. A vehicle body construction according to claim 11 wherein said clamping block is provided with a bore hole.

13. A vehicle body construction according to claim 12 wherein said connecting means further includes an L-shaped connecting portion provided with bore means adapted to align with said bore hole in said clamping block means.

14. A vehicle body construction according to claim 13 further including bolt means threaded into said bore hole in said clamping block means so as to secure said L-shaped portion to said at least one U-shaped member.

15. A vehicle body construction according to claim 5 wherein said fifth guide means for matingly engaging said first guide means with said third guide means and said second guide means with said fourth guide means comprises a pair of bevels provided on said L-shaped connecting portion.

16. A vehicle body construction according to claim 15 wherein said first, said second, said third and said fourth guide means comprises a substantially U-shaped member having a base portion and two substantially upwardly extending leg portions for matingly engaging with said bevels for facilitating a welding connection.

17. A vehicle body construction according to claim 3 wherein said connecting means includes a substantially L-shaped connecting portion.

18. A vehicle body construction according to claim 17 wherein said fifth guide means for matingly engaging said first guide means with said third guide means and said second guide means with said fourth guide means comprises extensions on the end of said connecting means received within said U-shaped members.

19. A vehicle body construction according to claim 18 wherein said extensions are welded to said base portion.

* * * * *